United States Patent Office 2,819,327
Patented Jan. 7, 1958

2,819,327

PROCESS FOR THE MANUFACTURE OF BUTADIENE

Cyril Romanovsky, Los Angeles, Calif., and Thomas Earl Jordan, Louisville, Ky., assignors to Publicker Industries Inc., Philadelphia, Pa., a corporation of Pennsylvania No Drawing. Application June 26, 1953
Serial No. 364,517

18 Claims. (Cl. 260—681)

This invention is directed to a process for the direct catalytic conversion of ethyl alcohol to butadiene.

It has been known for many years that butadiene (1,3 butadiene) a raw material in the manufacture of synthetic rubber can be obtained from ethyl alcohol. The relatively high price of ethyl alcohol, however, has rendered the commercial utilization of processes for the manufacture of butadiene from ethyl alcohol costly in comparison with the cost of butadiene obtained from other sources, such as from butene fractions derived from petroleum refineries.

In order to render such direct alcohol conversion processes commercially competitive, the development of catalysts having high activity and selectivity and consequently a high degree of alcohol conversion and yield of butadiene is necessary. Among the most active and selective of the catalysts heretofore developed for this purpose is the magnesia-silica type catalyst (see Szukiewicz Patent 2,357,855).

This invention has as an object the provision of an improved process for the direct catalytic conversion of ethyl alcohol to butadiene.

This and other objects are accomplished by the process of our invention which comprises contacting ethyl alcohol at an elevated temperature with a catalyst comprising a major weight percentage of magnesia and silica (preferably the magnesia being present in a greater weight percentage than the silica) and a minor weight percentage sufficient to confer improved catalytic conversion characteristics for catalyzing the direct conversion of ethyl alcohol to butadiene of a normal metal phosphate material composed of phosphate radicals chemically combined with calcium and nickel in the relative proportions of between 7.5 and 9.2 atoms of calcium per atom of nickel (most preferably in the ratio of 8.2 to 9 atoms of calcium per atom of nickel) and forming butadiene. Preferably, the normal metal phosphate material should be present in the catalyst in a concentration of from about 1–35 weight percent and most preferably in a concentration of about 5–25 weight percent. A catalyst consisting essentially of about 55–80 weight percent of magnesia, about 15–40 weight percent of silica and from about 5–25 weight percent of the normal metal phosphate material constitutes our most preferred embodiment for use in the process of our invention.

Our method for manufacturing the catalyst used in the process of our invention comprises first forming a solution (preferably an aqueous solution) of calcium ions, nickel ions and phosphate ions. This solution must contain the calcium and nickel ions in a ratio of about 7.5 to 9.2 atoms of calcium per atom of nickel. The solution is rendered non-acidic and a normal metal phosphate material composed of phosphate radicals chemically combined with calcium and nickel in the relative proportions of from 7.5 to 9.2 atoms of calcium per atom of nickel is precipitated therefrom. The normal metal phosphate material is commingled with a major weight percentage of magnesia and silica to form a substantially homogeneous mixture having improved catalytic conversion characteristics for catalyzing the direct conversion of ethyl alcohol to butadiene. Preferably, the commingling of the normal metal phosphate material is effected by dry blending this material with a major weight percentage of magnesia and silica to form a mixture, subsequently adding water to this mixture to form a hydration mass, homogenizing this hydration mass and then drying the homogenized hydration mass and forming catalyst particles therefrom.

The researches of Britton and Dietzler (see U. S. Patents 2,442,319; 2,442,320 and 2,456,367) have shown that there is a normal metal phosphate material, believed to comprise either a complex-type compound or perhaps a solid solution, consisting of phosphate radicals chemically combined with calcium and nickel and having a definite ratio of calcium atoms to nickel atoms averaging between 7.5 and 9.2 atoms of calcium per atom of nickel and preferably from 8.2 to 9 atoms of calcium per atom of nickel. Britton and Dietzler have established that this normal metal phosphate material is not a heterogeneous mixture of calcium phosphate and nickel phosphate but, instead, possesses unique and unexpected properties not possessed by a heterogeneous mixture of such materials. Thus as Britton and Dietzler have shown in the aforementioned patents the normal metal phosphate material comprises a useful catalyst for the dehydrogenation of olefins to conjugated diolefins under greatly elevated temperatures such as 600–750° C., whereas a heterogeneous mixture of the phosphates does not.

We have found that the normal metal phosphate material of Britton and Dietzler in admixture with magnesia and silica comprises a most useful catalyst for the direct catalytic conversion of ethyl alcohol to butadiene, which catalyst possesses improved catalytic conversion characteristics for this conversion over and beyond those possessed by a catalyst consisting of magnesia and silica. The Britton and Dietzler method for forming the normal metal phosphate material is suitable for our purposes.

As Britton and Dietzler have indicated in their patents, it is essential that the precipitation of the normal metal phosphate material be effected at non-acidic conditions, i. e., at neutral or alkaline conditions, and most preferably at a pH of between 8 and 12. Apparently, the normal metal phosphate material does not form, or if formed, assumes a different configuration when precipitation is effected under acidic conditions. The method set forth at Example 1 of Britton Patent 2,442,320 is an advantageous method for preparing the normal metal phosphate material and is set forth below, as a preferred method for forming the normal metal phosphate materials.

Approximately 20.9 pounds of a dilute aqueous ammonia solution (containing 372 grams, or 21.9 gram moles, of $NH_3$) was added with stirring to approximately 200 pounds of a dilute aqueous solution of orthophosphoric acid, which latter solution contained 665 grams, or 6.78 gram moles, of $H_3PO_4$. To the resultant ammonium phosphate solution, approximately 82.8 pounds of an aqueous solution of 986 grams (8.88 gram moles) of calcium chloride and 245 grams (1.02 gram moles) of nickel chloride, i. e. $NiCl_2 \cdot 6H_2O$, was added over a period of two hours. During this treatment, the mixture became flocculent due to formation of insoluble calcium nickel phosphate. After adding the ingredients stirring was continued for one-half hour. The mixture was then allowed to stand for about six hours, during which period the calcium nickel phosphate settled as a distinct lower layer. The supernatant liquor was removed by decantation, and the residue was repeatedly washed with water until the washings were substantially free of soluble nickel compounds and chlorides. The remaining mixture of water and calcium nickel phosphate was filtered, whereby the phosphate was obtained in the form of a gelatinous filter cake. The latter was dried by heating the same at 60° C. for 12 hours and thereafter at 130° C. for 24 hours. The product, which was a hard yellow gel, was ground to a particle size capable of passing a 28 mesh screen. The product is normal calcium nickel phosphate having an atomic ratio of calcium to nickel ions of approximately 8.7. It is suitable for use as a component of the catalyst used in the process of our invention.

By varying the relative proportions of calcium and nickel salts in the starting materials, but otherwise operating as just described, normal calcium nickel phosphates having other atomic ratios of calcium to nickel ions within the range of 7.5 to 9.2 atoms of calcium per atom of nickel may readily be prepared.

The normal metal phosphate material, such as that prepared above, is admixed with magnesia and silica to form the catalysts used in the process of our invention. This is most advantageously effected by dry blending pulverized magnesia, silica and normal metal phosphate material in correct proportions and then adding a relatively large volume of water to the dry-blended mixture to form a hydration mass. The hydration mass is homogenized by thorough mechanical agitation and is formed into a cake which can be set at room temperature. Subsequently the cake is dried and pulverized or pelleted into suitably sized catalyst particles or pellets.

While the aforementioned method of catalyst preparation involving the formation of a hydration mass is to be preferred, the normal metal phosphate material in the form of particles can be homogeneously commingled with a particulated magnesia-silica catalyst to form the catalyst of our invention.

As heretofore indicated, the preferred catalysts used in the process of our invention comprise about 65-99 weight percent of magnesia and silica and about 1-35 weight percent of the normal metal phosphate material. As heretofore indicated, the magnesia should be present in greater weight percentage than the silica, the preferred magnesia silica weight percentage being about 3-4:1, although improved results can be secured with catalysts having magnesia and silica present in the ratio of between about 50-80 parts by weight of magnesia and about 10-40 parts by weight of silica. The most preferred weight percentage for the normal metal phosphate material in the catalyst is about 5-25 weight percent. The most preferred catalyst compositions for the process of our invention comprise catalysts containing 55-80 weight percent of magnesia, 15-40 weight percent of silica and 5-25 weight percent of normal metal phosphate material with the optimum catalysts for many purposes comprising about 70 weight percent magnesia, about 20 weight percent silica and about 10 weight percent of normal metal phosphate material.

The preferred catalysts for the process of our invention consist essentially of magnesia, silica and the normal metal phosphate material. However, minor amounts of additional promoters such as chromium oxide, graphite, etc. can be present. The addition of such promoters is normally not necessary, and in fact in most cases does not improve the utility of the catalyst.

Concentrated alcohol, such as 95 percent ethyl alcohol is preferred, as the charge or feed for our process. An example of a useful alcohol feed is S. D. A. 29 which comprises one part by volume of acetaldehyde and 100 parts by volume of 95 percent alcohol. Optimum yields of butadiene are secured with the concentrated alcohol feeds of this type, although dilute alcohol feeds, such as feeds comprising 70 parts by weight of alcohol, 10 parts by weight of acetaldehyde and 20 parts by weight of water, can be used. However, with these dilute alcohol feeds the activity of the catalyst is appreciably reduced with a concomitant reduction in the unit conversion to butadiene product.

The operative reaction temperatures heretofore utilized with magnesia-silica catalysts for effecting the direct conversion of ethyl alcohol to butadiene can be employed with the process of our invention. However, the preferred reaction temperature for effecting this conversion is a temperature within the range of about 350–450° C., most preferably 390–420° C., with the optimum range being about 400–410° C. Under these optimum conditions, a space velocity of the order of 0.4–0.5 volume of feed per volume of catalyst per hour can advantageously be used. However, the space velocity can be varied in conjunction with the size of the catalyst particles, the reaction temperature, the spatial configuration of the conversion unit, etc. The preferred reaction pressure is a pressure approximating atmospheric pressure although of course other pressures can be used, if desired.

An example of the preparation of the catalyst used in the process of our invention is as follows:

Five hundred parts by weight of magnesia (neoprene grade, supplied by the General Magnesite Co.), 200 parts by weight of Magnesol (a magnesium silicate having a weight ratio of 21 percent magnesia and 79 percent silica supplied by the Westvaco Co.) and 80 parts by weight of normal metal phosphate material prepared in accordance with Example 1 of Britton Patent 2,442,320, were dry blended for a period of 15 minutes in a commercial dry blender, such as a Readco dough mixer. Fourteen hundred parts by weight of distilled water were added with continuous mixing over a period of several minutes. After the addition of the water was completed, mechanical agitation was temporarily discontinued and any material adhering to the walls of the mixing vessel was worked into the hydration mass. The agitation of the hydration mass was then resumed for a lengthy time interval so that the hydration mass was ultimately worked into a thick smooth paste.

The paste was transferred to a transite board and formed into a 1-inch thick cake. This cake was divided into 1-inch cubes and allowed to set at room temperature for one-half hour. Subsequent to the setting the cake was dried at 110° C. for a period of 18 hours. The dry catalyst cubes were then pulverized, sieved to retain suitably sized particles, and pelleted by means of a pill machine to form catalyst pellets. Sufficient moisture (about 10 weight percent water) was retained so that the use of a lubricant to form pellets or pills of the order of ¼-inch cylinders was not necessary.

The advantages achieved by the process of our invention is evident from an examination of the following table which reveals the degree of alcohol conversion and the butadiene, butene and ethylene yield when a feed comprising S. D. A. 29 (except as indicated by the footnote [1] in run No. 462 where the feed comprised 70 weight percent alcohol, 10 weight percent acetaldehyde and 20 weight percent water) was contacted with the catalyst compositions and the temperature conditions set forth below. The "complex" set forth in the table below, comprises the normal metal phosphate material as prepared by Example 1 of Britton Patent 2,442,230. The feed rate in each case was 400 milliliters of feed per liter of catalyst per hour.

| run | catalyst composition in weight percent | reaction temp., °C. | wt. percent alcohol converted | wt. percent butadiene yield | wt. percent butylene yield | wt. percent ethylene yield |
|---|---|---|---|---|---|---|
| 401 | 77.2-MgO, 22.8-SiO$_2$ | 400 | 34 | 23 | 14 | 18 |
| 404 | 77.2-MgO, 22.8-SiO$_2$ | 400 | 37 | 23 | 16 | 10 |
| 456 | 75.0-MgO, 25.0-SiO$_2$ | 400 | 30 | 26 | 12 | |
| 457 | 70.0-MgO, 30.0-SiO$_2$ | 400 | 25 | 22 | 11 | |
| 458 | 65.0-MgO, 35.0-SiO$_2$ | 400 | 23 | 23 | 11 | |
| | Level of best runs on MgO-SiO$_2$ catalyst | 400 | 35 | 24 | 14 | 11 |
| 439 | 69.1-MgO, 20.4-SiO$_2$, 10.5 complex | 390 | 46 | 31 | 20 | |
| 462 | 68.6-MgO, 20.3-SiO$_2$, 11.1-complex | 400 | 47 | 34 | 14 | |
| 462 | 68.6-MgO, 20.3-SiO$_2$, 11.1-complex [1] | 400 | 40 | 33 | 11.3 | |
| 511 | 69.5-MgO, 20.5-SiO$_2$, 10.0-complex | 400 | 54 | 31 | 17 | 3 |
| 427 | 97-complex, 1-Cr$_2$O$_3$, 2-graphite | 360 | 68 | 2.5 | 23 | 32 |
| 420 | 75.7-MgO, 22.3-SiO$_2$, 2-complex-promoter [2] | 390 | 49 | 27 | 16 | 5 |
| 416 | 68.8-MgO, 20.4-SiO$_2$, 10.8 Shell catalyst 205 [3] | 400 | 27 | 7 | 21 | |

[1] A feed comprising 70 weight percent ethyl alcohol, 10 weight percent acetaldehyde, 20 weight percent water.
[2] Complex in form used in run 427 namely 97-complex, 1-Cr$_2$O$_3$, 2-graphite.
[3] A commercial ferric oxide dehydrogenation catalyst.

It is evident from an examination of the table that the process of our invention achieves greater conversion of feed and greater yield of butadiene than processes employing magnesia-silica catalysts. Moreover, it is evident from an examination of results of run No. 416 that the improved results obtained with the process of our invention cannot be obtained with catalysts prepared by the addition of commercial dehydrogenation catalysts as a class to magnesia-silica catalysts, since as indicated, the addition of a commercial dehydrogenation catalyst comprising ferric oxide to magnesia and silica produced a decrease in both the activity and selectivity of the magnesia-silica with the decrease in selectivity being most striking. Moreover, as indictaed by a comparison of runs 420 and 427 the normal metal phosphate material, per se, is not a useful catalyst for the manufacture of butadiene.

In the following claims the expression "improved catalytic conversion characteristics" is to be construed as meaning superior catalytic conversion characteristics for catalyizing the direct conversion of ethyl alcohol to butadiene when compared with a catalyst consisting of magnesia and silica.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described our invention, we claim:

1. A process for the direct catalytic conversion of ethyl alcohol to butadiene comprising contacting ethyl alcohol at an elevated temperature with a catalyst comprising a major weight percentage of magnesia and silica and a minor weight percentage, sufficient to confer improved catalytic conversion characteristics for catalyzing the direct conversion of ethyl alcohol to butadiene, of a normal metal phosphate material formed under non-acidic conditions composed of phosphate radicals chemically combined with calcium and nickel in the relative proportion of from 7.5 to 9.2 atoms of calcium per atom of nickel and forming butadiene.

2. A process for the direct catalytic conversion of ethyl alcohol to butadiene comprising contacting 70–100% ethyl alcohol at 350–450° C. with a catalyst comprising a major weight percentage of magnesia and silica and a minor weight percentage, sufficient to confer improved catalytic conversion characteristics for catalyzing the direct conversion of ethyl alcohol to butadiene, of a normal metal phosphate material formed under non-acidic conditions composed of phosphate radicals chemically combined with calcium and nickel in the relative proportion of from 7.5 to 9.2 atoms of calcium per atom of nickel and forming butadiene.

3. A process for the direct catalytic conversion of ethyl alcohol to butadiene comprising contacting ethyl alcohol at an elevated temperature with a catalyst comprising a major weight percentage of magnesia and silica, said magnesia being present in a greater weight percentage than said silica, and a minor weight percentage, sufficient to confer improved catalytic conversion characteristics for catalyzing the direct conversion of ethyl alcohol to butadiene, of a normal metal phosphate material formed under non-acidic conditions composed of phosphate radicals combined with calcium and nickel in the relative proportions of between 7.5 and 9.2 atoms of calcium per atom of nickel and forming butadiene.

4. A process for the direct catalytic conversion of ethyl alcohol to butadiene comprising contacting 70–100% ethyl alcohol at 350–450° C. with a catalyst comprising a major weight percentage of magnesia and silica, said magnesia being present in a greater weight percentage than said silica, and a minor weight percentage, sufficient to confer improved catalytic conversion characteristics for catalyzing the direct conversion of ethyl alcohol to butadiene, of a normal metal phosphate material formed under non-acidic conditions composed of phosphate radicals combined with calcium and nickel in the relative proportions of between 7.5 and 9.2 atoms of calcium per atom of nickel and forming butadiene.

5. A process for the direct catalytic conversion of ethyl alcohol to butadiene comprising contacting 70–100% ethyl alcohol at a temperature of 350–450° C. with a catalyst comprising about 65–99 weight percent of magnesia and silica and about 1–35 weight percent of a normal metal phosphate material formed under non-acidic conditions composed of phosphate radicals chemically combined with calcium and nickel in the relative proportions of between 7.5 and 9.2 atoms of calcium per atom of nickel and forming butadiene.

6. A process for the direct catalytic conversion of ethyl alcohol to butadiene comprising contacting 70–100% ethyl alcohol at a temperature of 350–450° C. with a catalyst comprising about 50–80 parts by weight of magnesia, and about 10–40 parts by weight of silica, and about 1–35 parts by weight of a normal metal phosphate material formed under non-acidic conditions composed of phosphate radicals chemically combined with calcium and nickel in the relative proportions of between 7.5 and 9.2 atoms of calcium per atom of nickel and forming butadiene.

7. A process for the direct catalytic conversion of ethyl alcohol to butadiene comprising contacting 70–100% ethyl alcohol at a temperature of 350–450° C. with a catalyst comprising a major weight percentage of magnesia and silica, said magnesia being present in a greater weight percentage than said silica, and about 5–25 weight percent of a normal metal phosphate material formed under non-acidic conditions composed of phosphate radicals chemically combined with calcium and nickel in the relative proportions of between 7.5 and 9.2 atoms of calcium per atom of nickel and forming butadiene.

8. A process for the direct catalytic conversion of ethyl alcohol to butadiene comprising contacting 70–100% ethyl alcohol at a temperature of 350–450° C. with a catalyst consisting essentially of about 55–80 weight percent of magnesia, about 15–40 weight percent of silica and about 5–25 weight percent of a normal phosphate material formed under non-acidic conditions composed of phosphate radicals chemically combined with calcium and nickel in the relative proportions of between 7.5 and 9.2 atoms of calcium per atom of nickel and forming butadiene.

9. A process for the direct catalytic conversion of ethyl alcohol to butadiene comprising contacting 70–100% ethyl alcohol at a temperature of 390–420° C. with a catalyst consisting essentially of about 55–80 weight percent of magnesia, about 15–40 weight percent of silica and about 5–25 weight percent of a normal phosphate material formed under non-acidic conditions composed of phosphate radicals chemically combined with calcium and nickel in the relative proportions of between 7.5 and 9.2 atoms of calcium per atom of nickel and forming butadiene.

10. A process for the direct catalytic conversion of ethyl alcohol to butadiene comprising contacting 70–100% ethyl alcohol at a temperature of 400–410° C. and a space velocity of 0.4–0.6 volume of feed per volume of catalyst per hour with a catalyst consisting essentially of about 55–80 weight percent of magnesia, about 15–40 weight percent of silica and about 5–25 weight percent of a normal phosphate material formed under non-acidic conditions composed of phosphate radicals chemically combined with calcium and nickel in the relative proportions of between 7.5 and 9.2 atoms of calcium per atom of nickel and forming butadiene.

11. A process for the direct catalytic conversion of ethyl alcohol to butadiene comprising contacting ethyl alcohol at an elevated temperature with a catalyst comprising a major weight percentage of magnesia and silica and a minor weight percentage sufficient to confer improved catalytic conversion characteristics for catalyzing the direct conversion of ethyl alcohol to butadiene, of a normal metal phosphate material formed under non-acidic conditions composed of phosphate radicals chemically combined with calcium and nickel in the relative proportion of from 8.2 to 9.0 atoms of calcium per atom of nickel and forming butadiene.

12. A process for the direct catalytic conversion of ethyl alcohol to butadiene comprising contacting 70–100% ethyl alcohol at 350–450° C. with a catalyst comprising a major weight percentage of magnesia and silica and a minor weight percentage, sufficient to confer improved catalytic conversion characteristics for catalyzing the direct conversion of ethyl alcohol to butadiene, of a normal metal phosphate material formed under non-acidic conditions composed of phosphate radicals chemically combined with calcium and nickel in the relative proportion of from 8.2 to 9.0 atoms of calcium per atom of nickel and forming butadiene.

13. A process for the direct catalytic conversion of ethyl alcohol to butadiene comprising contacting ethyl alcohol at an elevated temperature with a catalyst comprising a major weight percentage of magnesia and silica, said magnesia being present in a greater weight percentage than said silica, and a minor weight percentage, sufficient to confer improved catalytic conversion characteristics for catalyzing the direct conversion of ethyl alcohol to butadiene, of a normal metal phosphate material formed under non-acidic conditions composed of phosphate radicals combined with calcium and nickel in the relative proportions of between 8.2 to 9.0 atoms of calcium per atom of nickel and forming butadiene.

14. A process for the direct catalytic conversion of ethyl alcohol to butadiene comprising contacting 70–100% ethyl alcohol at a temperature of 350–450° C. with a catalyst comprising about 65–99 weight percent of magnesia and silica and about 1–35 weight percent of a normal metal phosphate material formed under non-acidic conditions composed of phosphate radicals chemically combined with calcium and nickel in the relative proportions of between 8.2 to 9.0 atoms of calcium per atom of nickel and forming butadiene.

15. A process for the direct catalytic conversion of ethyl alcohol to butadiene comprising contacting 70–100% ethyl alcohol at a temperature of 350–450° C. with a catalyst comprising a major weight percentage of magnesia and silica, said magnesia being present in a greater weight percentage than said silica, and about 5–25 weight percent of a normal metal phosphate material formed under non-acidic conditions composed of phosphate radicals chemically combined with calcium and nickel in the relative proportions of between 8.2 to 9.0 atoms of calcium per atom of nickel and forming butadiene.

16. A process for the direct catalytic conversion of ethyl alcohol to butadiene comprising contacting 70–100% ethyl alcohol at a temperature of 350–450° C. with a catalyst consisting essentially of about 55–80 weight percent of magnesia, about 15–40 weight percent of silica and about 5–25 weight percent of a normal phosphate material formed under non-acidic conditions composed of phosphate radicals chemically combined with calcium and nickel in the relative proportions of between 8.2 to 9.0 atoms of calcium per atom of nickel and forming butadiene.

17. A process for the direct catalytic conversion of ethyl alcohol to butadiene comprising contacting 70–100% ethyl alcohol at a temperature of 390–420° C. with a catalyst consisting essentially of about 55–80 weight percent of magnesia, about 15–40 weight percent of silica and about 5–25 weight percent of a normal phosphate material formed under non-acidic conditions composed of phosphate radicals chemically combined with calcium and nickel in the relative proportions of between 8.2 to 9.0 atoms of calcium per atom of nickel and forming butadiene.

18. A process for the direct catalytic conversion of ethyl alcohol to butadiene comprising contacting 70–100% ethyl alcohol at a temperature of 400–410° C. and a space velocity of 0.4–0.5 volume of feed per volume of catalyst per hour with a catalyst consisting essentially of about 55–80 weight percent of magnesia, about 15–40 weight percent of silica and about 5–25 weight percent of a normal phosphate material formed under non-acidic conditions composed of phosphate radicals chemically combined with calcium and nickel in the relative proportions of between 8.2 to 9.0 atoms of calcium per atom of nickel and forming butadiene.

References Cited in the file of this patent

UNITED STATES PATENTS

| | | |
|---|---|---|
| 2,423,681 | Butterbaugh et al. | July 8, 1947 |
| 2,442,319 | Britton et al. | May 25, 1948 |

OTHER REFERENCES

Berkman et al.: Catalysis, Reinhold Pub. Co., 330 W. 42nd Street, New York, N. Y. (1940), pages 888–9.